United States Patent [19]

Bateman et al.

[11] Patent Number: 4,678,211
[45] Date of Patent: Jul. 7, 1987

[54] JOINTS FORMED WITH WELDED FLANGE PIPES

[75] Inventors: Terence Bateman, Chesterfield; William W. Stevens, Ilkeston, both of England

[73] Assignee: Stanton and Staveley Limited, United Kingdom

[21] Appl. No.: 760,472

[22] Filed: Jul. 30, 1985

[30] Foreign Application Priority Data

Aug. 10, 1984 [GB] United Kingdom ............... 8420328
Feb. 27, 1985 [GB] United Kingdom ............... 8505030

[51] Int. Cl.$^4$ .................................... F16L 21/02
[52] U.S. Cl. .................... 285/368; 285/412; 285/413; 285/416
[58] Field of Search ............... 285/368, 416, 412, 413

[56] References Cited

U.S. PATENT DOCUMENTS

| | | | |
|---|---|---|---|
| 925,770 | 6/1909 | Herrick | 285/368 X |
| 1,951,034 | 3/1934 | Norton | 285/368 X |
| 2,239,307 | 4/1941 | Weber | 285/368 |
| 2,657,079 | 10/1953 | David | 285/368 X |
| 3,165,339 | 1/1965 | Faccou | 285/368 X |
| 3,720,428 | 3/1973 | Zastawny | 285/368 |
| 4,478,439 | 10/1984 | Arnold | 285/368 X |

Primary Examiner—Richard J. Scanlan, Jr.
Attorney, Agent, or Firm—Bacon & Thomas

[57] ABSTRACT

The invention provides a joint formed with a welded flange pipe wherein a spigot of one pipe, provided with a spigot flange welded thereto, is disposed in a socket of another pipe having a socket flange assembly located thereabout, the spigot flange and the socket flange assembly being connected by holding members linked therebetween, the socket flange assembly being a composite structure capable of assembly at the socket end of the pipe to encircle and engage the socket and bear upon the socket in use.

6 Claims, 9 Drawing Figures

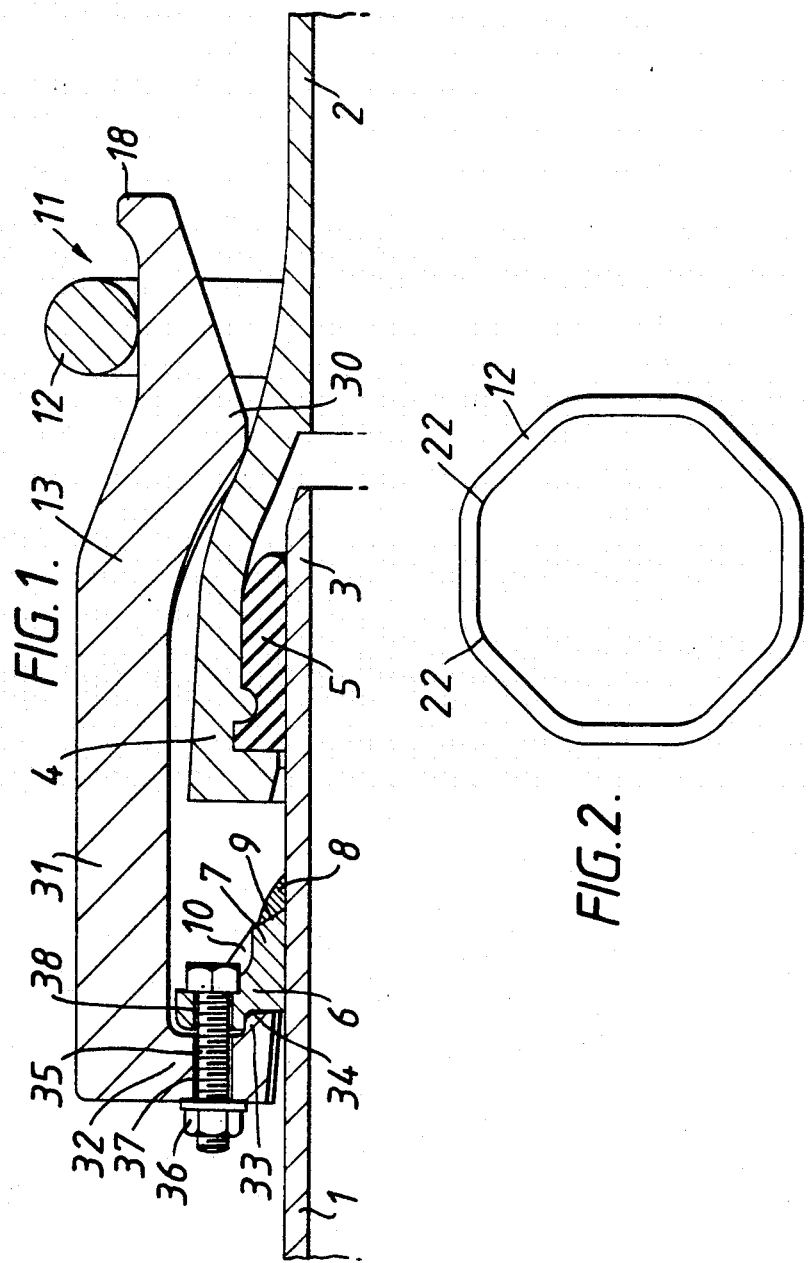

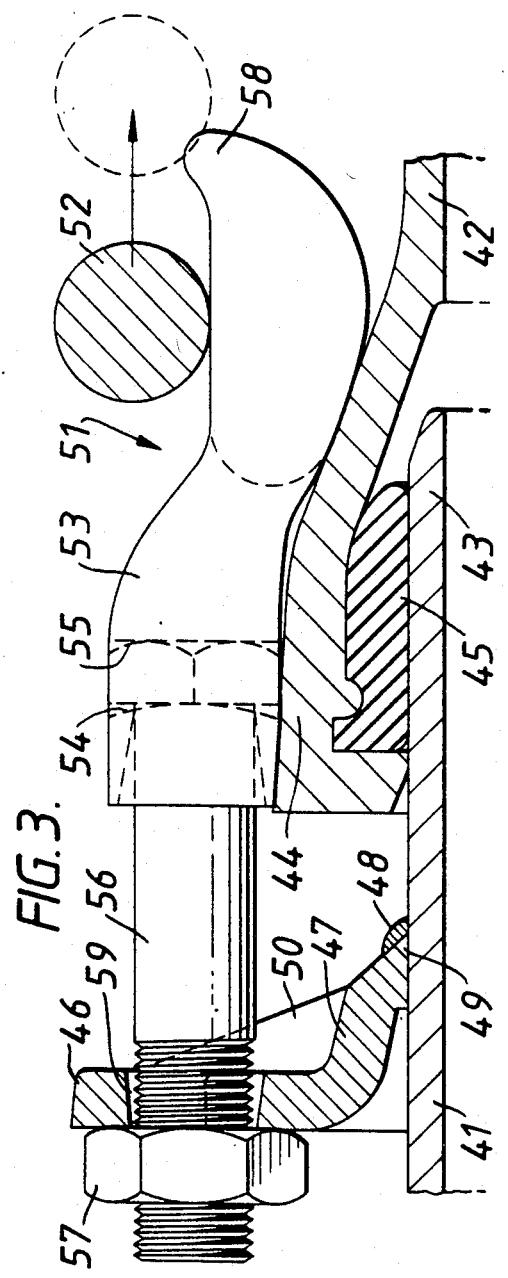
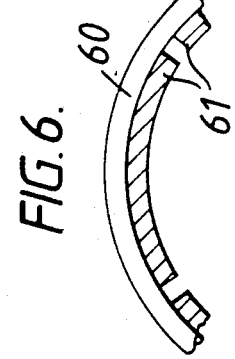
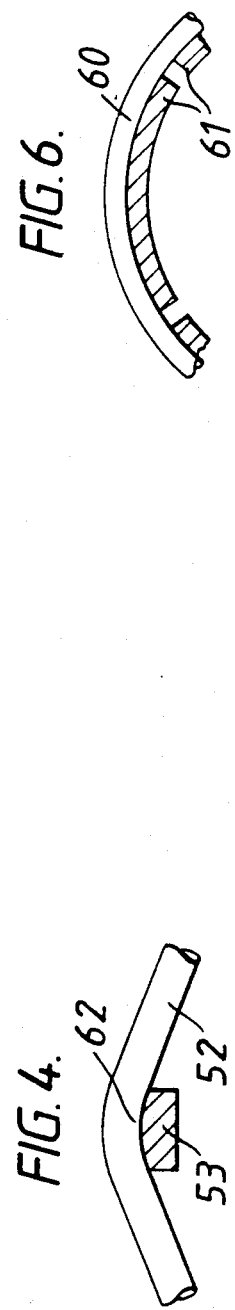

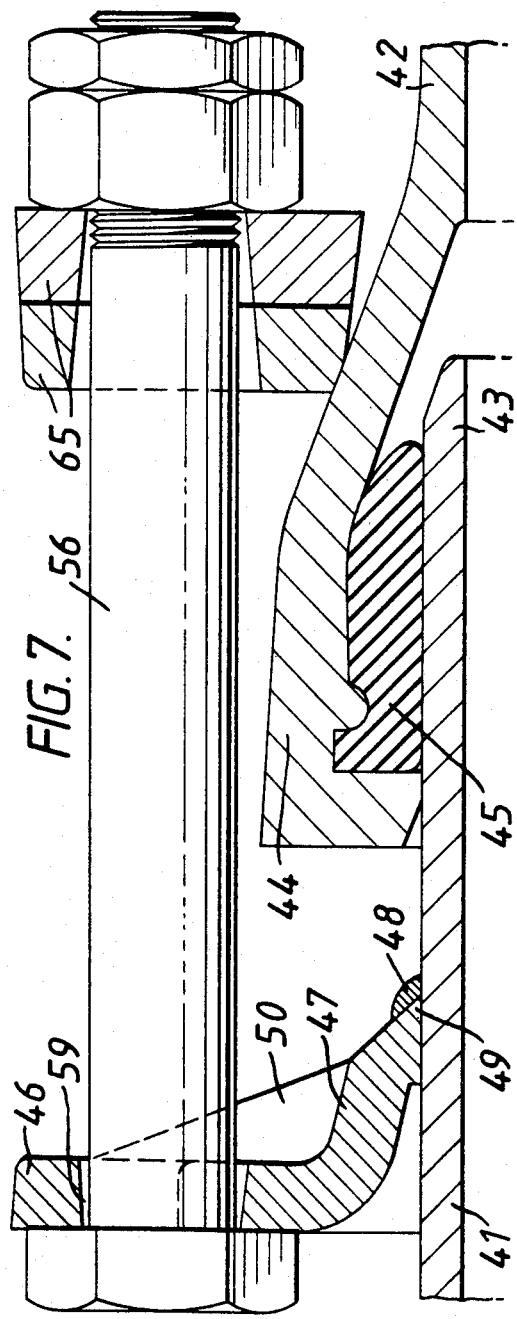
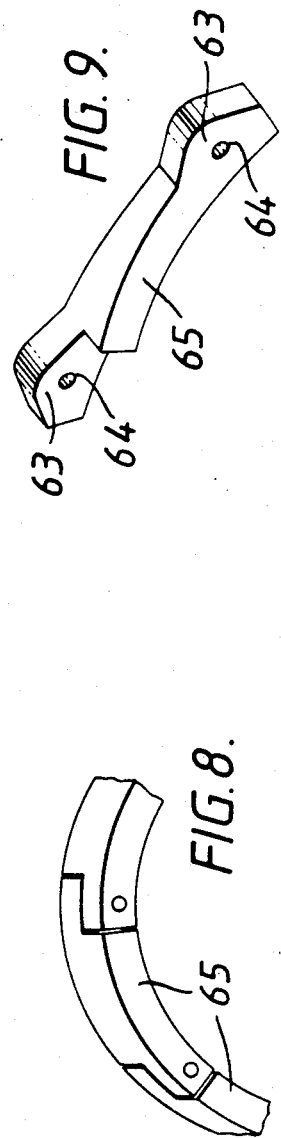

JOINTS FORMED WITH WELDED FLANGE PIPES

This invention relates to welded flange pipes of ferrous material of the kind in which a ferrous annular flange by means of which the pipe is to be attached to an adjacent pipe, is secured by welding around the outer periphery of the pipe adjacent one end thereof, and more particularly relates to joints using such pipes where the flange is located adjacent to a spigot of the pipe which is arranged for insertion into the socket of an axially juxtaposed pipe (usually with the interposition of an annular sealing member between the spigot and socket respectively), the flange in such an arrangement being connectable by means of securing members to a socket flange located behind or upon the socket so as to enable the joint to be locked together.

It is to be understood that the word "pipe" as used herein includes any pipe-like member such as pipe, tube or hose, and hollow pipe fittings for use in pipe-work such as elbows and "T" junction members.

In configuration the flange on the spigot (the "spigot flange") may include a radially inner portion extending towards the end of the pipe. With such a configuration the flange may be welded to the pipe at the toe of the inward portion extending towards the end of the pipe and on the side thereof facing towards the end of the pipe.

One problem with such joints depends from the requirement that the socket flange should have a smaller internal diameter than the outside diameter of the socket of its associated pipe, so that the socket of one pipe is held firmly over the spigot of the other by the securing members linking the socket flange with the spigot flange.

A socket flange is usually fitted to a pipe by passing it from the spigot of the pipe over the pipe to the socket end. However, in some circumstances, such as where the pipe is a "T" junction member for example having socket mouths, this is not possible.

It is an object of the present invention to provide a simple and effective tie-bar joint which overcomes the above mentioned problems.

According to one aspect of the invention there is provided a joint formed with a welded flange pipe wherein a spigot of one pipe, provided with a spigot flange welded thereto, is disposed in a socket of another pipe having a socket flange assembly located thereabout, the spigot flange and the socket flange assembly being connected by holding members linked therebetween, the socket flange assembly being a composite structure capable of assembly at the socket end of the pipe to encircle and engage the socket and bear upon the socket in use.

According to another aspect of the invention there is provided a coupling assembly for a joint between spigot and socket pipes comprising a spigot flange for welding around the spigot of one pipe; a socket flange assembly for location about the socket of a second pipe jointed to the first pipe; the spigot flange and the socket flange assembly being connectable by holding members linkable therebetween; the socket flange assembly being a composite structure capable of assembly at the socket to encircle and engage the socket and bear upon it in jointing use.

The socket flange assembly may be in the form of a plurality of interlinked members engageable about the socket and connected to the spigot flange by holding members.

Alternatively, the socket flange assembly may be in the form of a continuous ring of larger diameter than the socket, together with a plurality of shoes, each connectable with the spigot flange, spaced around the ring and located between the ring and the socket such as to bear, when connected to the spigot flange, against the socket.

The shoes may be provided with elongate portions which may be adapted to engage the spigot flange directly so as to constitute, at least in part, the holding means between the spigot flange and the socket flange assembly.

Yet again the socket flange assembly may comprise a flange member split into portions, e.g. in two halves, and arranged to be secured together after placing about the socket, by means for example of bolts passing through shoulders of the flange member portions held with nuts.

The pipes and flange assemblies may be ductile cast iron or steel, for example.

In order that the invention may be more readily understood, two embodiments thereof will now be described by way of example with reference to the accompanying drawings in which:

FIG. 1 is a part sectional side elevation of part of one form of a joint between two pipes in accordance with the invention;

FIG. 2 is an end view of the socket ring of the joint illustrated in FIG. 1;

FIG. 3 is a part sectional side elevation of part of a second form of a joint between two pipes in accordance with the invention;

FIGS. 4 and 5 are scrap views of parts of the joint illustrated in FIG. 3;

FIG. 6 is a scrap view of a variation of part of the joint in FIG. 3;

FIG. 7 is a part sectional side elevation of part of a third form of a joint between two pipes in accordance with the invention; and FIGS. 8 and 9 show variations of part of a joint of the kind illustrated in FIG. 7.

Figure 5:
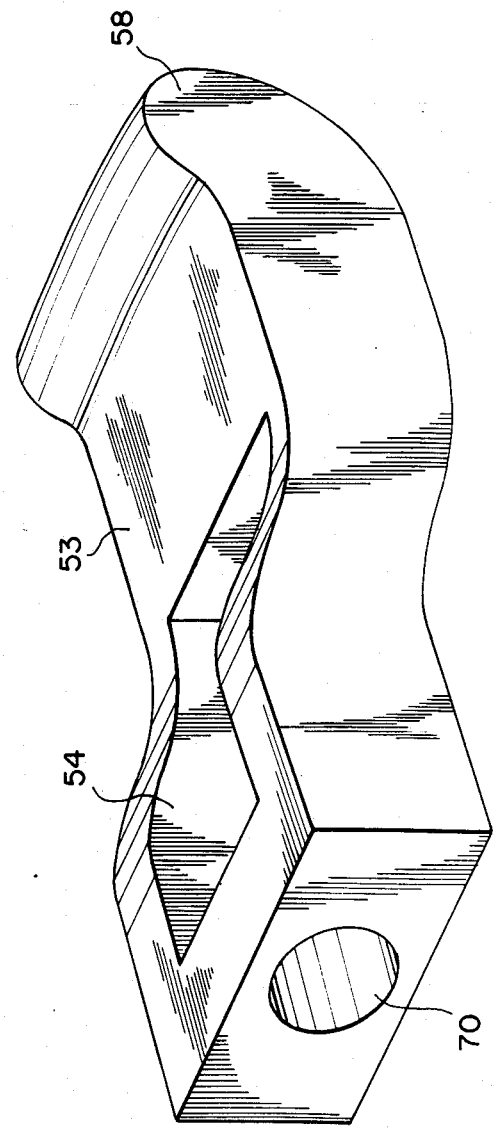

Referring now to FIGS. 1 and 2 of the drawings, it will be seen that the joint comprises two ductile cast iron pipes 1 and 2 incorporating a spigot and socket 3 and 4 respectively together with a resilient sealing member 5 located in the annular gap therebetween to prevent leakage of the pipe at this joint.

A ductile cast iron spigot flange 6 is mounted on the pipe 1 adjacent the spigot 3 thereof. As will be seen, the radially inner portion of the flange has an extension 7 directed towards the end of the spigot 3 and the flange is welded at 8 to the pipe at the side of the toe 9 of the extension. A plurality of strengthening webs 10 are disposed around the flange 6 on the side thereof facing towards the spigot.

A socket flange assembly 11 is mounted around the socket of the pipe in such a manner as to constitute, in use, a fixed annular member. The flange assembly is an octagonal ductile cast iron ring 12 of circular cross section (best seen in FIG. 2) having an internal dimension larger than the socket so that it can be fitted over the socket prior to use. At each of the angles 22 of the octagon 12 a ductile cast iron shoe 13 is fitted between the ring 12 and the socket 4. Each shoe has a radially outwardly directed rear shoulder 18, and a radially inwardly directed heel 30.

It is to be understood that the number of sides to the ring, and hence the number of shoes used is related to the outside diameter of the pipes concerned.

The shoes 13 and the ring 12 of the flange assembly 11 are shaped so as to allow axial movement in order to accommodate reasonable joint deflection.

Each shoe 13 has an elongate portion 31 which extends, when the joint is assembled, beyond and radially outside the spigot flange 6. The elongate portion 31 of each shoe has a radially inwardly extending shoe flange 32 extending behind the spigot flange, the shoe flange 32 having an inwardly directed lip 33 which engages, in use, in an annular recess 34 around the spigot flange 6. Each shoe flange 32 is correctly located against the spigot flange 6 by bolts 35 and nuts 36 passing through appropriate bores 37, 38 in the flanges.

In fitting this arrangement together, the ring 12 is fed over the socket 4. The necessary eight shoes are then located under the ring 12, one at each angle 22, and the assembly of shoes 13, bolts 16 and ring 2 are then pulled into a position where the heels 30 of the shoes 13 engage the outer inclined surface of the socket 4, and the lips 33 of the shoe flanges 32 engage the recess 34 of the spigot flange 6, thereby holding together the spigot flange and socket flange assembly and, hence, by virtue of the ring 12 holding the heels 30 of the shoes behind the socket, holding the joint firmly together. Nuts and bolts 35 and 36 are then fastened to locate securely the shoes on the spigot flange. Location of the ring on the shoes is assisted by the shoulders 18.

Referring now to FIGS. 3, 4 and 5 of the drawings, it will be seen that the joint comprises two ductile cast iron pipes 41 and 42 incorporating a spigot and socket 43 and 44 respectively together with a resilient sealing member 45 located in the annular gap therebetween to prevent leakage of the pipe at the joint.

A ductile cast iron spigot flange 46 is mounted on the pipe 41 adjacent the spigot 43 thereof. As will be seen, the radially inner portion 47 of the flange is deflected towards the spigot 43 and the flange is welded at 48 to the pipe at the side of the toe 49 of this deflected portion facing towards the spigot 43. A plurality of strengthening webs 50 are disposed around the flange 46 on the side thereof facing towards the spigot.

A socket flange assembly 51 is mounted around the socket of the pipe in such a manner as to constitute, in use, a fixed annular member. As can be seen in FIG. 4, the flange assembly is a polygonal (octagonal illustrated) ductile cast iron ring 52 of circular cross section having an internal dimension larger than the socket so that it can be fitted over the socket prior to use. At each of the angles of the octagon a ductile cast iron shoe 53 is fitted between the ring 52 and the socket 44. Each shoe is apertured at 54 to receive the head 55 of a bolt 56 passing through bore 70 for connecting through the spigot flange 46 to a nut 57. Each shoe has a radially outwardly directed rear shoulder 58.

The shoes 53 and the ring 52 of the flange assembly 51 are shaped so as to allow axial movement in order to accommodate reasonable joint deflection.

In fitting this arrangement together, the ring 52 is fed over the socket 44. The necessary eight shoes are then located under the ring 52, one at each angle 62, already provided with bolts 56 extending therefrom, and the assembly of shoes 53, bolts 56 and ring 52 are then pulled into a position where the heels of the shoes 53 engage the outer inclined surface of the socket 44. The spigot flange 46 and shoes 53 are then connected by fitting nuts 57 to the bolts 56 after passing the bolts through holes 59 in the spigot flange. Location of the ring on the shoes is assisted by shoulders 58.

The arrangement of FIG. 6 is similar to that of FIGS. 3, 4 and 5 except that a ring 60 of circular configuration is used and corresponding shoes 61 of an arc-like configuration are located therebeneath. Again (although not shown), bolts are located within the shoes and protrude from openings thereof to engage the spigot flange.

The arrangements of FIGS. 7, 8 and 9 are generally similar to that of the other figures except that, in this case, the socket flange formed from a plurality of link members 65, the bolts 56 connecting from the spigot flange 46 acting as link pivot pins. As can be seen from FIGS. 7 and 8 the socket flange can be of uniform circular internal and external diameter, or can be provided, as shown in FIG. 9, with radially outwardly extending projections 63 adjacent holes 64 for the bolts 56 for extra strength. By means of the invention as illustrated, a joint for welded spigot flange pipes is obtained wherein the socket flange can easily be placed about the socket pipe, without detracting from the strength or performance of the completed joint.

It is to be noted that in the embodiment of FIGS. 1 and 2, the usual requirements for heavy duty steel tie bars connecting the spigot flange and socket flange assembly is obviated. The latter aspect reduces the cost of the joint and reduces corrosion problems particularly with pipes intended for underground use. In addition, by using a shoe of the kind used in the embodiment of FIGS. 1 and 2 instead of a tie-bar as has been previously proposed, the spigot flange can be smaller, and hence the meridional bending strains in the bore of the spigot pipe considerably reduced.

The arrangement of FIGS. 3, 4, 5 and 6 has considerable axial adjustability, whilst the arrangement of FIGS 7, 8 and 9 is especially useful where only two or three ties are to be utilised, such as with small size pipe and joints.

We claim:

1. A joint formed with a welded flange pipe wherein a spigot of one pipe, provided with a spigot flange welded thereto, is disposed in a socket of another pipe having a socket flange assembly located thereabout, the spigot flange and the socket flange assembly being connected by holding members linked therebetween, the socket flange assembly being in the form of a continuous ring of larger diameter than the socket together with a plurality of shoes, each connectable with the spigot flange, spaced around the ring and located between the ring and the socket such as to bear, when connected to the spigot flange, against the socket.

2. A joint as claimed in claim 1 wherein the shoes are provided with elongate portions which may be adapted to engage the spigot flange directly so as to constitute at least partially, the holding members between the spigot flange and the socket flange assembly.

3. A joint as claimed in claim 1 wherein the holding members comprise nuts and bolts located in appropriate bores in the shoes and the spigot flange.

4. A joint as claimed in claim 1 wherein each shoe is provided at its end remote from the spigot flange with radially outwardly directed shoulder providing endmost location for the ring, and a radially inwardly directed heel for bearing against the socket.

5. A joint as claimed in any one of claims 1 to 4 wherein the continuous ring is of polygonal configuration with a shoe located at each corner of the polygon.

6. A coupling assembly for a joint between spigot and socket pipes comprising a spigot flange for welding around the spigot of one pipe; a socket flange assembly for location about the socket of a second pipe jointed to the first pipe; the spigot flange and the socket flange assembly being connectable by holding means linkable therebetween; the socket flange assembly being a composite structure capable of assembly at the socket to encircle and engage the socket and bear upon it in jointing use, the socket flange assembly being in the form of a continuous ring of larger diameter than the socket about which it is to be fitted, together with a plurality of shoes, each connectable with a spigot flange, arranged to be spaced around the ring and located between the ring and the socket such as to bear, in use, when connected to the spigot flange, against the socket.

* * * * *